US010444716B2

(12) United States Patent
Mazzoldi et al.

(10) Patent No.: US 10,444,716 B2
(45) Date of Patent: Oct. 15, 2019

(54) INFORMATION SHARING BETWEEN BUILDINGS TO TRIGGER ACTIONS IN A RECEIVING BUILDING

(71) Applicant: Autodesk, Inc., San Rafael, CA (US)

(72) Inventors: Florencio Mazzoldi, Prior Lake, MN (US); Olivier Dionne, Montreal (CA); Thomas White, Burlington (CA); Heather Kerrick, Oakland, CA (US); Christopher C. Romes, West Linn, OR (US)

(73) Assignee: Autodesk, Inc., San Rafael, CA (US)

( * ) Notice: Subject to any disclaimer, the term of this patent is extended or adjusted under 35 U.S.C. 154(b) by 582 days.

(21) Appl. No.: 15/089,409

(22) Filed: Apr. 1, 2016

(65) Prior Publication Data

US 2017/0285590 A1 Oct. 5, 2017

(51) Int. Cl.
*G05B 15/02* (2006.01)
*H04L 12/28* (2006.01)

(52) U.S. Cl.
CPC .......... *G05B 15/02* (2013.01); *H04L 12/2816* (2013.01); *Y04S 20/227* (2013.01)

(58) Field of Classification Search
CPC .................. Y02B 70/3241; H04L 12/2803
See application file for complete search history.

(56) References Cited

U.S. PATENT DOCUMENTS

| 9,230,424 | B1* | 1/2016 | Scalisi | G08B 27/005 |
| 2008/0238668 | A1* | 10/2008 | Johnsen | G08B 25/10 340/541 |
| 2012/0046796 | A1* | 2/2012 | Zhang | G06Q 10/00 700/291 |
| 2017/0243472 | A1* | 8/2017 | Davies | G06Q 30/0601 |

OTHER PUBLICATIONS

Information Sciences Institute, Univsersity of Southern California; RFC 793: Transmission Control Protocol; Sep. 1981. Retrieved from Internet Engineering Task Force using Internet <URL:https://tools.ietf.org/html/rfc793> (Year: 1981).*

(Continued)

*Primary Examiner* — Robert E Fennema
*Assistant Examiner* — Jonathan Michael Skrzycki
(74) *Attorney, Agent, or Firm* — Fish & Richardson P.C.

(57) ABSTRACT

Methods, systems, and apparatus, including medium-encoded computer program products, for passing actionable information between different buildings to facilitate building management without human intervention include, in one aspect, a method including: determining, in a building information modelling (BIM) system of a first building, a set of rules defining actions to be taken by a building automation system of the first building in response to a defined set of remote information received from a BIM system of a second building, the set of remote information corresponding to one or more sensors in or associated with the second building; receiving data from the BIM system of the second building in accordance with the set of remote information; and using the building automation system of the first building to automatically change configuration, use, or operation of the first building in response to the received data in accordance with the set of rules.

15 Claims, 6 Drawing Sheets

(56) References Cited

OTHER PUBLICATIONS

Unknown author, "BIM: Building Information Modeling," (Jan. 12, 2016) [online] (retrieved from http://www.autodesk.com/solutions/building-information-modeling/overview), 3 pages.

Unknown author, "Building information modeling—Wikipedia, the free encyclopedia," (Jan. 12, 2016) [online] (retrieved from https://en.wikipedia.org/wiki/Building_information_modeling), 13 pages.

Unknown author, "Rethinking productivity across the construction industry: the challenge of change," (2015) [online] (retrieved from http://static-dc.autodesk.net/content/dam/autodesk/www/solutions/building-information-modeling/construction/EIU_Autodesk_Construction_WEB.pdf), 21 pages.

Unknown author, "Building management system—Wikipedia, the free encyclopedia," (Mar. 29, 2016) [online] (retrieved from https://en.wikipedia.org/wiki/Building_management_system), 4 pages.

Unknown author, "Explore AEC Solutions," (Mar. 29, 2016) [online] (retrieved from http://www.autodesk.com/solutions/bim/overview), 8 pages.

Liu and Akinci, "Requirements and Evaluation of Standards for Integration of Sensor Data with Building Information Models," *Computing in Civil Engineering*, 2009, pp. 95-104.

Leite and Akinci, "Formalized Representation for Supporting Automated Identification of Critical Assets in Facilities during Emergencies Triggered by Failures in Building Systems," *J. Comput. Civ. Eng.*, 2012, 26(4):519-529.

\* cited by examiner

INFORMATION SHARING BETWEEN BUILDINGS TO TRIGGER ACTIONS IN A RECEIVING BUILDING

BACKGROUND

This specification relates to passing actionable information between different buildings to facilitate building management without human intervention.

BIM (Building Information Modelling) can be used to plan, design, construct, and manage buildings and other infrastructure items. A building information model can include a digital representation of physical and functional characteristics of a building. The building information model can be used for automated decisions made for a building during the building's lifecycle. The building's lifecycle can include construction, use and management, and demolition.

SUMMARY

This specification describes technologies relating to passing actionable information between different buildings to facilitate building management without human intervention.

In general, one or more aspects of the subject matter described in this specification can be embodied in one or more methods that include: determining, in a building information modelling (BIM) system of a first building, a set of rules defining actions to be taken by a building automation system of the first building in response to a defined set of remote information received from a BIM system of a second building, the set of remote information corresponding to one or more sensors in or associated with the second building; receiving data, over a communication channel, from the BIM system of the second building in accordance with the set of remote information; and using the building automation system of the first building to automatically change configuration, use, or operation of the first building in response to the received data in accordance with the set of rules.

The method can include sending the received data to a BIM system of a third building. The method can include: determining, in the BIM system of the first building, a set of local information to be sent under one or more predefined conditions to the BIM system of the second building, the set of local information corresponding to one or more sensors in or associated with the first building; and sending data, over a communication channel, to the BIM system of the second building in accordance with the set of local information when the one or more predefined conditions are satisfied. The method can include sending a response to the received data to the BIM system of the second building. The received data can include environmental or security data. The security data included in the received data can be related to a security threat that has arisen in the second building. The set of local information can include environmental or security data. The security data included in the set of location can be related to a security threat that has arisen in the first building. The method can include sending a request to the BIM system of the second building for the BIM system of the second building to send the remote information.

According to another aspect, a system can include a first sensor network in or in association with a first building. The first sensor network can include one or more sensors coupled to one or more respective local controllers for controlling operation of equipment in or associated with the first building by way of respective actuators. The system can include a different, second sensor network in or in association with a second building. The system can include a first supervisory controller in or associated with the first building coupled directly to individual sensors in the first sensor network or indirectly through respective local controllers. The first supervisory controller can include one or more rules and a communication channel for communicating with a second supervisory controller in the second building. Each sensor network can be operable to sense one or more of environmental indications in or associated with a respective first or second building, use or occupancy of the first or second building, or configuration of one or more systems in or associated with the first or second building. The first supervisory controller can be configured to: receive data related to a condition detected in or associated with the second building, the data indicating sensed data from the second building based on data generated by sensors in the second sensor network; and automatically determine a response to the received data including initiating one or more of the respective actuators associated with the first building to make a change in configuration, use or operation of the first building.

According to another aspect, a system can include a non-transitory storage medium having instructions of a building information modelling (BIM) program stored thereon and one or more data processing apparatus. The one or more data processing apparatus can be configured to run the instructions of the BIM program to: (i) determine, in a building information modelling (BIM) system of a first building, a set of rules defining actions to be taken by a building automation system of the first building in response to a defined set of remote information received from a BIM system of a second building, the set of remote information corresponding to one or more sensors in or associated with the second building; (ii) receive data, over a communication channel, from the BIM system of the second building in accordance with the set of remote information; and (iii) use the building automation system of the first building to automatically change configuration, use, or operation of the first building in response to the received data in accordance with the set of rules.

Particular embodiments of the subject matter described in this specification can be implemented to realize one or more of the following advantages. A BIM system of a building can receive information about a security threat associated with an adjacent building. A BIM system in a building can initiate actions to perform in response to remote information received from a BIM system of another building. Information about security and other threats can be shared between a group of buildings. Information and resources can be shared between buildings.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A BIM system can be used to plan, design, construct, and manage a building. The BIM system can be configured to receive remote data from another BIM system associated with another building. The BIM system can access a set of rules that define actions to be taken by the BIM system (e.g., by a building automation system associated with the BIM system) in response to the received remote data. The remote data can correspond, for example, to one or more sensors associated with the other building. The actions can include, for example, using the building automation system to automatically change configuration, use, or operation of the building in response to the received data in accordance with the set of rules. For example, environmental or security conditions can be changed in the building based on the receipt of the remote data. Although the BIM systems described herein are referred to as Building Information Modelling systems, it will be appreciated that the system need not include features related to planning, design and construction of a building, and so a BIM system can be or include building information management systems, building automation systems, and other types of computer-controlled systems as well.

Figure 1:
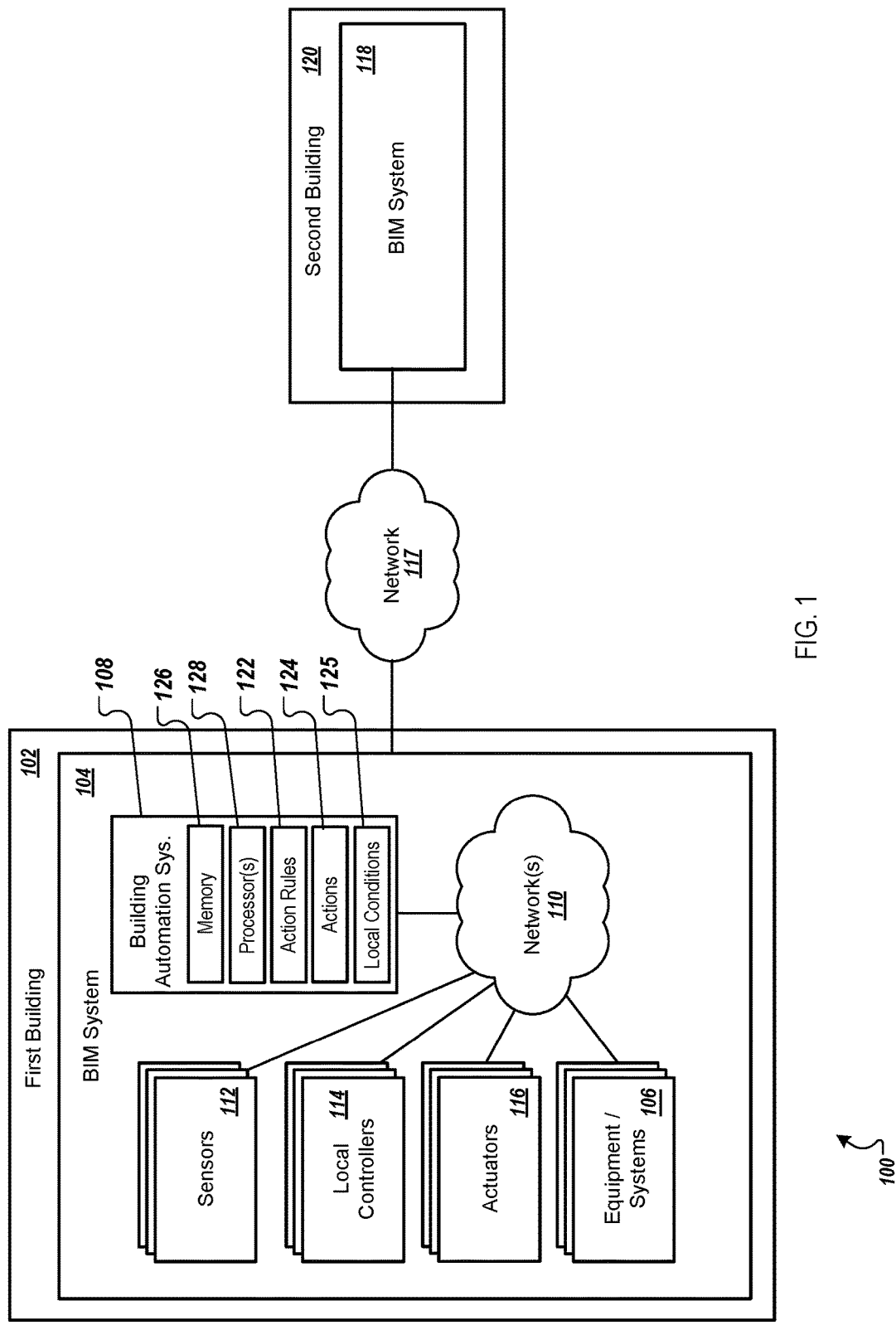
FIG. 1 illustrates an example of a system for communicating actionable information between buildings.

FIG. 1 illustrates an example of a system 100 for communicating actionable information between buildings. A first building 102 includes a BIM system 104. The BIM system 104 manages equipment/systems 106, which can include environmental (e.g., HVAC (Heating Ventilating Air Conditioning)) equipment, security systems and equipment, and other internal systems of the first building 102. A building automation system 108 can, for example, receive, over one or more networks 110, information associated with the equipment/systems 106, such as information from sensors 112 associated with the equipment/systems 106. The building automation system 108 can perform a set of control algorithms that control the equipment/system 106, based on the received information. For example, the building automation system 108 can send instructions to local controllers 114 which can control the equipment/systems 106 using actuators 116.

The BIM system 104 can be configured to control the equipment/systems 106 in response to remote information received over a network 117 from a BIM system 118 associated with a second building 120. The second building 120 can, for example, be adjacent to the first building 102, on a same campus as the first building 102, in a same city as the first building 102, etc. Remote data sent from the BIM system 118 to the BIM system 104 can correspond to information from sensors associated with the second building 120. The remote information can, for example, relate to environmental conditions in the second building 120, security information (e.g., information about a potential security threat), build information, computer system information, network information, or other information about the second building 120.

A set of rules 122 can be defined in the BIM system 104 which define actions 124 to perform in response to particular types of remote data received from the BIM system 118. The actions 124 can include, for example, the sending of instructions to the local controllers 114 to control the equipment/systems 106 to automatically change configuration, use, or operation of the first building 102 in response to the received remote data. For example, environmental or security configurations can be changed, equipment/systems 106 can be shut down, backup equipment can be initialized, emergency or lock-down procedures can be initiated, or internal security and/or local first responders can be notified. The actions 124 can include the forwarding of the remote data received from the BIM system 118 to one or more other BIM systems associated with one or more other buildings. Information sent to other BIM systems in response to the remote data received from the BIM system 118 can include information about environmental, security, and other conditions related to the first building 102.

The actions 124 can include the sending of a response to the BIM system 118. The response can include, for example, data relating to environmental, security, or other conditions associated with the first building 102 (e.g., an exchange of environmental, security, or other information can be completed). The response sent to the BIM system 118 can include a description of any actions performed in the first building 102 in response to the remote data received from the BIM system 118.

Alternatively or in addition to the sending of data, by BIM system 104, to the BIM system 118 in response to data received from the BIM system 118, the BIM system 104 can be configured to send local conditions 125 related to the first building 102 (e.g., corresponding to information received from the sensors 112, and/or other information received or determined by the building automation system 108) to the BIM system 118 (and/or to other BIM systems) in response to detection of one or more local conditions 125 occurring in the first building 102. For example, if certain environmental or security conditions are detected, the BIM system 104 can gather and send certain types of information related to the equipment/systems 106 (and/or other information known by the building automation system 108) to the BIM system 118.

The building automation system 108 can be, for example, a computing device that includes memory 126, e.g., random access memory (RAM), and one or more processors 128 for executing program instructions, such as one or more control algorithms, including the performing of the actions 124 in accordance with the rules 122. The networks 110 and 117 can each be, for example, a wireless cellular network, a wireless local area network (WLAN) or Wi-Fi network, a mobile telephone network or other telecommunications network, a wired Ethernet network, a private network such as an intranet, a public network such as the Internet, or any appropriate combination of such networks.

Figure 2:
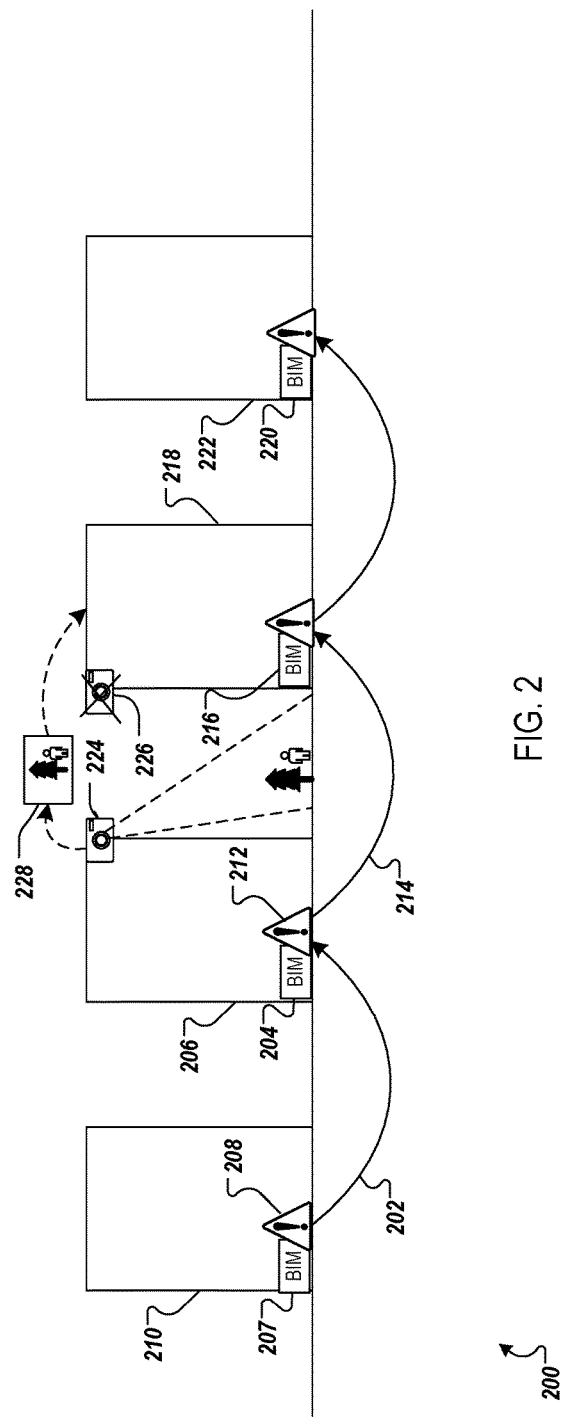
FIGS. 2 and 3A illustrates examples of systems for information sharing between buildings.

FIG. 2 illustrates an example of a system 200 for information sharing between buildings. As illustrated by an arrow 202, a BIM system 204 in a building 206 can receive alarm information from a BIM system 207 related to an alarm 208 occurring in an adjacent building 210. The BIM system 204 can identify one or more rules which indicate one or more actions to be performed when information matching a type of the received alarm information is received by the BIM system 204. For example, the rules can indicate that the BIM system 204 is to generate an alarm condition 212 in the BIM system 204 (e.g., to alert security personnel about the receipt of the alarm information related to the alarm 208). As another example and as illustrated by an arrow 214, the rules can indicate that the BIM system 204 is to forward the received alarm information to a BIM system 216 included in an adjacent building 218. The BIM system 216 can forward the alarm information to a BIM system 220 in another adjacent building 222, and so on.

BIM systems in different building can share other types of information. For example, security camera video can be shared between buildings. In some implementations, a BIM system in one building can share security camera video when video camera equipment in another building malfunctions. For example, the buildings 206 and 218 include or are otherwise associated with first and second video cameras 224 and 226, respectively. The second video camera 226 is not functioning. The BIM system 216 can detect the malfunction of the second video camera 226 and can send a message about the malfunction to the BIM system 204. In response to the message, the BIM system 204 can initiate the sending of security camera video generated by the first video camera 224 (e.g., as illustrated by an image 228) to the BIM system 216.

As another example, security camera video can be shared between BIM systems in response to certain types of events occurring in one or more of the BIM systems. For example, in response to the receipt of respective alarm information by the BIM systems 204 and 216, video captured by the first and second video cameras 224 and 226 (e.g., when the second video camera 226 is working) can be sent to the other respective BIM system.

Figure 3A:
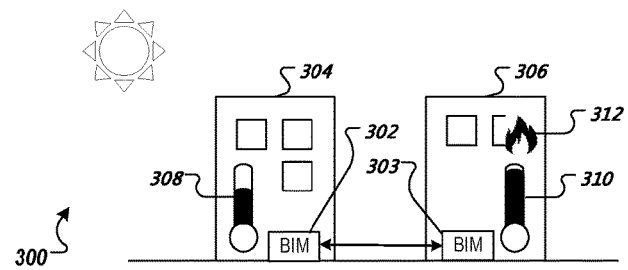

FIG. 3A illustrates an example of a system 300 for information sharing between buildings. A first BIM system 302 and a second BIM system 303 respectively included in a first building 304 and a second building 306 can each manage a respective building. The BIM systems 302 and 304 can be configured to exchange information, such as information associated with one or more sensors included in a respective building. For example, the first BIM system 302 can send a temperature reading (e.g., represented by a symbol 308) of an area or equipment included in the first building 304 to the second BIM system 303 and/or the second BIM system 303 can send a temperature reading (e.g., represented by a symbol 310) of an area or equipment included in the second building 306 to the first BIM system 302. Temperature or other sensor-related information can be sent periodically or in response to a condition (e.g., a value that is greater or less than a predefined threshold).

Each of the first BIM system 302 and the second BIM system 303 can, in response to received information from the other BIM system, evaluate one or more rules to determine whether one or more actions should be performed by the receiving BIM system in response to the received information. For example, if a received value (e.g., temperature) is more than a threshold different than a corresponding value monitored by the receiving BIM system, a resource sharing request or offer can be sent to the sending BIM system (e.g., as described in more detail below with respect to FIGS. 3B and 3C). As another example, if a received value (e.g., temperature) is more than a threshold different than a predefined value, an alert can be triggered by the receiving BIM system (e.g., to alert personnel in the building associated with the receiving BIM system that a threat or problem may be occurring with respect to the sending BIM system which may also be a threat to the building associated with the receiving BIM system).

For example, the BIM system 302 can evaluate a received temperature value corresponding to the symbol 310 and determine that the received temperature value is greater than a predefined threshold (e.g., which may indicate a fire 312 occurring in the building 306). The BIM system 302 can, for example, automatically generate one or more alerts in the building 304 which can be sent, for example, to security personnel associated with the building 304, community first responders, etc. The alert(s) sent to the community first responders by the BIM system 302 may be redundant to alert(s) that may have been sent to the community first responders by the BIM system 303. However, the fire 312 may have compromised at least some of the functionality of the BIM system 303 and related equipment, which may have prevented alerts from being sent by the BIM system 303. The alerts sent by the BIM system 302 to security personnel associated with the building 304 can alert the security personnel that the fire 312 may be a threat to the building 304 as well as to the building 306.

Figure 3B:
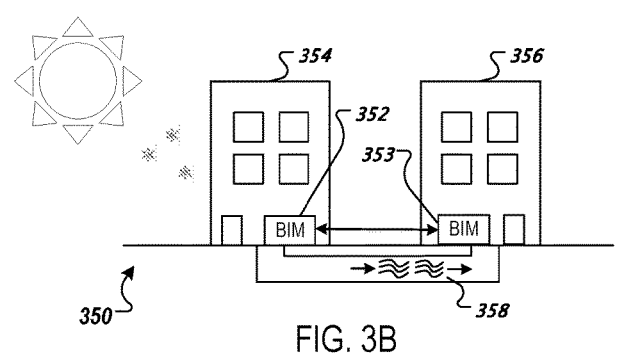
FIGS. 3B and 3C illustrate examples of systems for collaborative information and resource sharing between buildings.

FIG. 3B illustrates an example of a system 350 for collaborative information and resource sharing between buildings. A first BIM system 352 and a second BIM system 353 respectively included in a first building 354 and a second building 356 can each monitor temperature of a respective building and energy used to maintain the temperature of the respective building. The BIM systems 352 and 353 can be configured to exchange energy consumption information, such as amount of energy used to maintain each building at a particular temperature. For example, in winter months, the energy consumed by the first building 354 may be less than the energy consumed by the second building 356 due to a warming sun effect caused by more sun exposure for the first building 354 as compared to the second building 356.

The second BIM system 353 (or in some implementations, the first BIM system 352) can determine that the first building 354 uses less energy than the second building 356 based on a comparison of energy consumption information provided by the first BIM system 352 to energy consumption information provided by the second BIM system 353. The second BIM system 353 can identify a rule that states that if energy consumption of an adjacent building is more efficient by at least a predetermined amount (or percentage), that the second BIM system 353 is to send a resource sharing request to a BIM system of the adjacent building (e.g., the first BIM system 352).

The first BIM system 352 can receive the resource sharing request and identify one or more rules for processing the request. A rule for processing the request can include, for example, definition of one or more conditions in which the resource sharing request is to be accepted or denied and respective action(s) to take if the resource sharing request is accepted or denied. For example, in response to determining that the resource sharing request is to be accepted, the first BIM system 352 can initiate actuation of resource sharing, such as by actuating a flow of warm air 358 from the first building 354 to the second building 356 (e.g., through a pathway shared by the first building 354 and the second building 356). The first BIM system 352 can, also in response to determining that the resource sharing request is to be accepted, configure heating equipment in the first building 354 to generate more heat, to meet increased demand caused by the flow of the warm air 358 to the second building 356.

The first BIM system 352 can send an acceptance response to the resource sharing request to the second BIM system 353. The second BIM system 353 can, in response to receiving the acceptance response, configure equipment in the second building 356 to receive the warm air 358 from the first building 354. The second BIM system 353 can also configure heating equipment in the second building 356 to generate less heat as compared to before the sending of the resource sharing request, to account for the warm air 358 received from the first building 354.

As another example, the first BIM system 352 can identify a rule specifying that a resource sharing offer is to be sent to an adjacent building in response to a determination that the first building 354 is more efficient at maintaining a desired temperature than the adjacent building. For example, the first BIM system 352 can send a resource sharing offer to the second BIM system 353. The second BIM system 353 can send an acceptance or a denial of the offer. In response to receiving an acceptance of the offer, the first BIM system 352 can initiate actuation of the resource sharing.

Figure 3C:
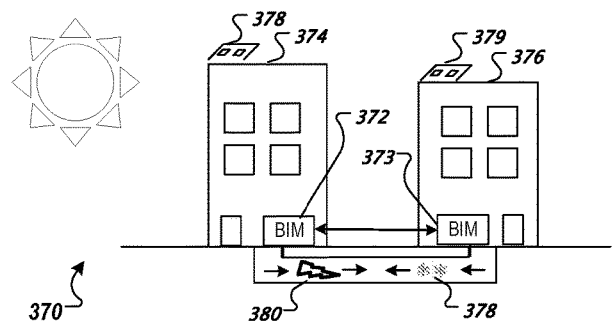

FIG. 3C illustrates another system 370 for collaborative information and resource sharing between buildings. Similar to the system 350 described above with respect to FIG. 3B, a first BIM system 372 and a second BIM system 373 respectively included in a first building 374 and a second building 376 can monitor energy consumption in the respective buildings. The BIM systems 372 and 373 can be configured to exchange energy-related information, such as amount of energy used to maintain each building at a particular temperature. The first BIM system 372 (or in some implementations, the second BIM system 373) can determine that the amount of energy used to cool the first building 374 is more than the amount of energy used to cool the second building 376 based on a comparison of energy consumption information provided by the first BIM system 372 to energy consumption information provided by the second BIM system 373 (e.g., in summer months, a greater sun exposure can increase cooling costs for the first building 374). The first BIM system 372 can identify a rule that states that if energy consumption of an adjacent building is more efficient by at least a predetermined amount (or percentage), that the first BIM system 372 is to send a resource sharing request to a BIM system of the adjacent building (e.g., the second BIM system 373). The second BIM system 373 can receive and accept the request and initiate actuation of resource sharing, such as by actuating a flow of cold air 378 from the second building 376 to the first building 374.

As another example, the first BIM system 372 and the second BIM system 373 can exchange information regarding the amount of energy generated by solar panels 378 and 379 attached to the first building 374 and the second building 376, respectively. The greater sun exposure for the first building 374 can result in more energy produced by the solar panel 378 as compared to that produced by the solar panel 379, for example. In response to receiving energy production information, one or both of the first BIM system 372 and the second BIM system 373 can determine that the solar panel 378 produces more energy than the solar panel 379. The first BIM system 372 can, for example, determine to send an energy sharing offer to the second BIM system 373. As another example, the second BIM system 373 can determine to send an energy sharing request to the first BIM system 372. In response to the energy sharing request, or in response to acceptance of the energy sharing offer, the first BIM system 372 can initiate the sending of energy to the second building 376 (e.g., as illustrated by a symbol 380).

Figure 4:
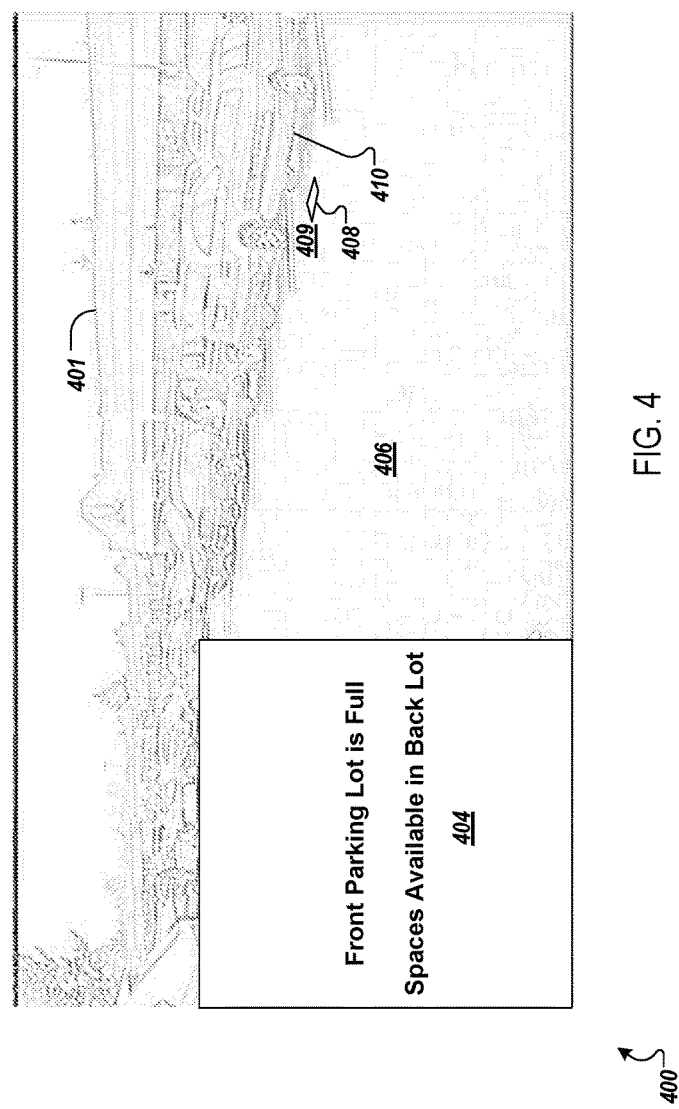
FIGS. 4 and 5 illustrate examples of systems for information sharing.

FIG. 4 illustrates an example of a system 400 for information sharing. A BIM system associated with a building 401 can communicate with sensors or systems that are included in an area that surrounds the building 401. For example, the BIM system can control a sign 404 based on information received from sensors included in parking lots that are adjacent to the building 401. The sign 404 can communicate parking availability of a first (e.g., "front") parking lot 406 and a second (e.g., "back") parking lot (not shown). The BIM system can receive information from sensors included in the parking lot 406, such as a sensor 408, determine parking availability for a respective parking lot based on the received information, and update the sign 404 to display information which indicates the parking availability. The sensor 408, which is shown, for example, embedded within a parking space 409 in which a car 410 is parked, can indicate whether the parking space 409 is occupied. The sensor 408 can also be, for example, located on a post or curb adjacent to the parking spot 409. As another example, one or more video cameras can provide a view of the first parking lot 406 (and the second parking lot), and the BIM system can determine parking availability of the first and second parking lots based on image or video content captured by the one or more video cameras. The BIM system can include a module which has logic to determine what message (if any) is to be displayed on the sign 404 based on the information received from sensors such as the sensor 408, received video images, or other received information. As another example, the BIM system can send electronic messages indicating the parking lot status to user mobile devices, such as to users who have subscribed to receive such messages. In some implementations, the BIM system can determine that one or more subscribing users are en route to the building 401 and can send a parking lot status message to those users.

Figure 5:
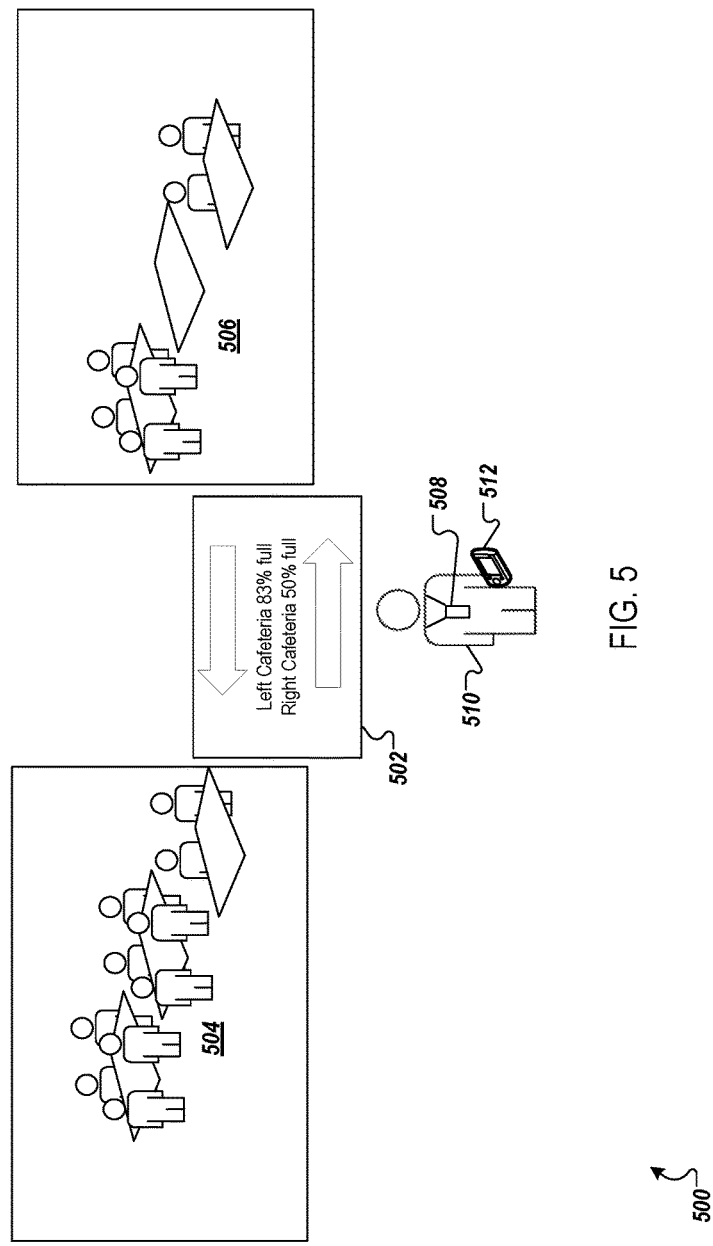

FIG. 5 illustrates a system 500 for information sharing. A BIM system included in a building can perform one or more actions based on occupancy information received, for example, from personal devices (e.g., mobile devices, identification badges) associated with people who are located within or near the building. For example, a sign 502 included in a building displays information regarding occupancy of a first (e.g., left) cafeteria 504 and a second (e.g., right) cafeteria 506. A BIM system included in the building can, for example, receive information from sensors associated with people (e.g., employees) who are located in the first or second cafeterias 504 or 506. The BIM system can determine an occupancy level of the first and second cafeterias 504 and 506 and can provide occupancy information for display on the sign 502. For example, a badge 508 of an employee 510 can include an RFID (Radio Frequency Identification) tag. As another example, the BIM system can receive information from a user device 512 of the employee 510. The BIM system can, for example, determine the number of respective employees that are located in the first or second cafeteria 504 or 506 based on the location of respective RFID tags included in employee badges and/or on information received from respective user devices. In addition to or alternatively to displaying a message on the sign 502, the BIM system can send an electronic occupancy message to mobile user devices, such as for users who have subscribed to see such messages. In some implementations, messages can be sent to subscribing users who are within a certain distance of the cafeteria 504 or 506 (e.g., users who may be en route to the cafeteria 504 or 506). Other actions can be performed based on occupancy information received from personal devices. For example, service requests, such as servicing a restroom or assigning a certain number of staff personnel, can be initiated in response to determining that at least a threshold number of people are located within or have passed through a particular area of the building.

Figure 6:
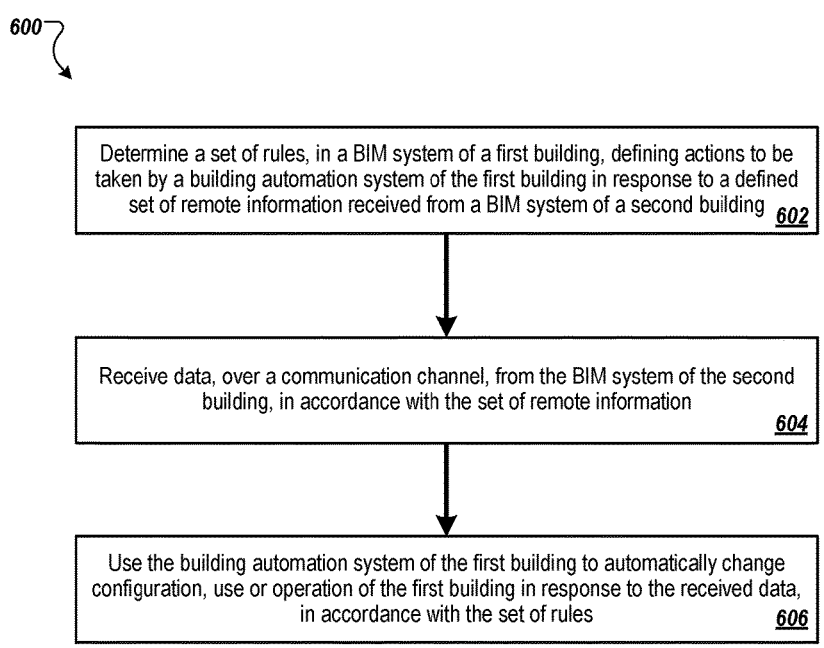
FIG. 6 shows an example of a flowchart of a process to pass actionable information between different buildings to facilitate building management without human intervention.

FIG. 6 shows an example of a flowchart of a process 600 to pass actionable information between different buildings to facilitate building management without human intervention. A set of rules is determined 602, in a BIM system of a first building, defining actions to be taken by a building automation system of the first building in response to a defined set of remote information received from a BIM system of a second building. For example, a given rule can define one or more actions to perform when a certain type of information, or information of a certain type that is within a predefined range, is received from the BIM system of the second building.

In some implementations, a user interface of the BIM system can be presented to a user which enables the user to specify rules and actions for a given building. For example, a rule specified for a given building can be a custom rule that is specific to the given building and the environment of the given building. As another example, predefined rules that are retrieved from local storage or a remote server can be loaded into the BIM system and presented to the user for selection. The predefined rules can be applicable to more than one building, for example.

Data is received 604, over a communication channel, from the BIM system of the second building, in accordance with the set of remote information. The received data can correspond to one or more sensors or other data-providing equipment in or associated with the second building. The received data can include environmental or security data related to the second building, for example. The security data can be related to a security threat that has arisen in the second building.

The building automation system of the first building is used 606 to automatically change configuration, use, or operation of the first building in response to the received data, in accordance with the set of rules. For example, one or more environmental and/or security configurations can be changed in the first building. In some implementations, the received data is sent (e.g., forwarded) to a BIM system of a third building. In some implementations, a response to the received data is sent to the BIM system of the second building.

As described in the examples above, the first and second buildings can be commercial buildings. As another example, one or both of the first or second buildings can be residential buildings. A BIM system can be, for example, a home security system. As a particular example, a first home security system in a first home may detect the existence or possible existence of a fire in the first home and may notify a second home security system in a second home (e.g., an adjacent neighbor's home). The second home security system can trigger an alarm in the second home in response to receipt of the notification from the first home security system. Other examples are possible. For example, the first home security system can be configured to notify the second home security system or a personal device of the neighbor when the owner of the first home is on vacation in response to certain events occurring in the first home, such as a thermostat falling below a threshold (e.g., indicating a danger of freezing pipes) or a water usage level exceeding a threshold (e.g., indicating a possible water leak).

As another example, the first and/or second buildings can be other physical structures. For example, a BIM system in a first building can detect a threat and can notify a management system that controls security equipment (e.g., security gates) for a bridge. The management system for the bridge can actuate the security equipment (e.g., close a security gate) in response to the notification.

Although the process 600 is described above as passing actionable information between different buildings to facilitate building management without human intervention, one or more human actions can be performed in response to receipt of actionable information from another building. For example, a human operator can receive a notification and can initiate an action to actuate equipment, notify other personnel, etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the embodiments are generally described in the context of a BIM system being associated with a single building. In other embodiments, a BIM system can manage information and automation associated with an area around a building and/or two or more buildings on a defined parcel of land. In addition, the actions recited in the claims can be performed in a different order and still achieve desirable results.

What is claimed is:

1. A method for passing actionable information between different buildings to facilitate building management without human intervention, the method comprising:
   accessing, in a building information modelling (BIM) system of a first building, a set of predefined rules defining different actions to be taken by a building automation system of the first building in response to different types of remote information received from at least a BIM system of a second building;
   receiving an energy sharing request, over a communication channel, from the BIM system of the second building in accordance with the set of remote information, wherein the energy sharing request is sent based on the BIM system of the second building having determined that one or more predefined environmental conditions for sending local data to the BIM system of the first building have been satisfied;
   determining, in response to the received energy sharing request, a matching predefined rule in the set of predefined rules that specifies an energy sharing action to perform when an energy sharing request is received; and
   using the building automation system of the first building to automatically perform the energy sharing action to send one or more energy resources from the first building to the second building in response to the received energy sharing request, in accordance with the set of rules.

2. The method of claim 1, further comprising forwarding the received energy sharing request to a BIM system of a third building.

3. The method of claim 1, further comprising:
   determining, in the BIM system of the first building, a set of local information to be sent under one or more predefined conditions to the BIM system of the second building, the set of local information corresponding to environmental data obtained from one or more sensors in or associated with the first building; and sending data, over a communication channel, to the BIM system of the second building in accordance with the set of local information when the one or more predefined conditions are satisfied.

4. The method of claim 1, further comprising sending a response to the received energy sharing request to the BIM system of the second building.

5. The method of claim 3, wherein the received energy sharing request from the BIM system of the second building is generated in response to the BIM system of the second building:

receiving the set of local information from the BIM system of the first building;

comparing the set of local information to corresponding environmental information in the second building; and determining, based on the comparing, that energy consumption in the first building is more efficient than energy consumption in the second building.

6. The method of claim 5, wherein the energy sharing action comprises actuating one or more actuators of HVAC (Heating, Ventilating and Air Conditioning) equipment of the first building to send the one or more energy resources from the first building to the second building, to respond to the energy sharing request.

7. The method of claim 1, wherein the received energy sharing request includes environmental data related to HVAC (Heating, Ventilating and Air Conditioning) equipment of the second building.

8. The method of claim 3, wherein the set of local information comprises an energy sharing offer for sharing an energy resource of the first building, wherein the energy sharing offer is generated based on the BIM system of the first building:

receiving environmental data from the second building;

comparing the received environmental data to corresponding environmental information in the first building; and determining, based on the comparing, that energy consumption in the first building is more efficient than energy consumption in the second building.

9. The method of claim 1, further comprising sending a request to the BIM system of the second building for the BIM system of the second building to send the remote information.

10. A non-transitory computer storage medium having instructions stored thereon that cause data processing apparatus to perform operations comprising:

accessing, in a building information modelling (BIM) system of a first building, a set of predefined rules defining different actions to be taken by a building automation system of the first building in response to different types of remote information received from at least a BIM system of a second building;

receiving an energy sharing request, over a communication channel, from the BIM system of the second building in accordance with the set of remote information, wherein the energy sharing request is sent based on the BIM system of the second building having determined that one or more predefined environmental conditions for sending local data to the BIM system of the first building have been satisfied;

determining, in response to the received energy sharing request, a matching predefined rule in the set of predefined rules that specifies an energy sharing action to perform when an energy sharing request is received; and using the building automation system of the first building to automatically perform the energy sharing action to send one or more energy resources from the first building to the second building in response to the received energy sharing request, in accordance with the set of rules.

11. The computer storage medium of claim 10, the operations further comprising forwarding the received energy sharing request to a BIM system of a third building.

12. The computer storage medium of claim 10, the operations further comprising:

determining, in the BIM system of the first building, a set of local information to be sent under one or more predefined conditions to the BIM system of the second building, the set of local information corresponding to environmental data obtained from one or more sensors in or associated with the first building; and sending data, over a communication channel, to the BIM system of the second building in accordance with the set of local information when the one or more predefined conditions are satisfied.

13. The computer storage medium of claim 10, the operations further comprising sending a response to the received energy sharing request to the BIM system of the second building.

14. The computer storage medium of claim 12, wherein the received energy sharing request from the BIM system of the second building is generated in response to the BIM system of the second building:

receiving the set of local information from the BIM system of the first building;

comparing the set of local information to corresponding environmental information in the second building; and determining, based on the comparing, that energy consumption in the first building is more efficient than energy consumption in the second building.

15. The computer storage medium of claim 10, wherein the energy sharing action comprises actuating one or more actuators of HVAC (Heating, Ventilating and Air Conditioning) equipment of the first building to send the one or more energy resources from the first building to the second building, to respond to the energy sharing request.

\* \* \* \* \*